United States Patent [19]

Kirk

[11] 4,004,289
[45] Jan. 18, 1977

[54] ACOUSTIC GRAIN FLOW RATE MONITOR

[75] Inventor: Thomas G. Kirk, Saskatoon, Canada

[73] Assignee: Canadian Patents and Development Limited, Ottawa, Canada

[22] Filed: Dec. 17, 1975

[21] Appl. No.: 641,663

[52] U.S. Cl. .................... 340/267 R; 56/DIG. 15; 340/259; 340/261

[51] Int. Cl.² .................................. G08B 21/00

[58] Field of Search ............... 340/206 R, 259, 261; 56/DIG. 15

[56] References Cited

UNITED STATES PATENTS

| | | | |
|---|---|---|---|
| 3,393,557 | 7/1968 | Brown et al. | 340/261 |
| 3,593,720 | 7/1971 | Botterill et al. | 56/DIG. 15 |
| 3,606,745 | 9/1971 | Girodat | 56/DIG. 15 |
| 3,793,627 | 2/1974 | Darrel et al. | 340/267 R |
| 3,935,866 | 2/1976 | Northup et al. | 56/DIG. 15 |
| 3,939,846 | 2/1976 | Drozhzhin et al. | 56/DIG. 15 |

Primary Examiner—Glen A. Swann, III
Attorney, Agent, or Firm—Edward Rymek

[57] ABSTRACT

A grain flow rate monitor has a high sensitivity for the detection of seed loss in the chaff ejected from a thresher, which may be used for monitoring heavy or light seed grains. The monitor includes an acousto-electric sensor upon which the chaff impinges to produce a wide frequency spectrum signal. This signal is passed through two or more band pass filters which are centered at predetermined frequencies. When two filters are utilized, they will each have a predetermined bandwidth, one of which is contained in the 0 to 25 kHz range and the other contained in the 25 to 100 kHz range. The filter outputs are coupled to detectors for detecting either the peak amplitudes in each band or the average amplitude. These detector amplitudes are compared in a comparator to determine whether the ratio of their magnitudes fall within a predetermined ratio range which is indicative of a seed striking the sensor. The comparator thus provides output pulses related to seed strikes which are recorded and/or displayed for the thresher operator.

8 Claims, 4 Drawing Figures

ACOUSTIC GRAIN FLOW RATE MONITOR

BACKGROUND OF THE INVENTION

This invention is direct to grain flow rate monitor and in particular to a monitor for measuring the amount of seed thrown out the back of a thresher with the straw and chaff.

In operating a combine thresher, it is important to minimize the amount of grain being lost out of the rear of the combine as it is thrown out along with the chaff and straw. A farmer attempts to minimize this grain loss by adjusting the thresher and controlling the forward speed for particular harvesting conditions so as to recover the highest percentage of grain possible. Grain flow rate monitors of the type described in U.S. Pat. No. 3,593,720 which issued to Botterill et al on July 20, 1971 and in U.S. Pat. No. 3,606,745 which issued to Girodat on Sept. 21, 1971, measure the amount of seed being lost out of the rear of a thresher, and therefore assist the farmer in determining the proper thresher adjustments and forward speed.

Though these monitors have been useful in reducing grain losses, particularly in the heavier cereal grains, such as wheat, barley, etc., they have been found to lack sensitivity in distinguishing between grain and chaff in many crops. This lack of sensitivity is particularly acute in the monitoring of oil seed grains such as rape and flax. These grains have very light seeds and sensitivity is lacking since both the seeds and the chaff are nearly equal in weight.

SUMMARY OF THE INVENTION

It is therefore an object of this invention to provide a grain monitor having a high sensitivity.

It is a further object of this invention to provide a grain monitor capable of monitoring all types of grain.

These and other objects are achieved in a grain flow rate monitor in which an acousto-electric sensing means is mounted such that the chaff and seed ejected from the thresher strikes the sensor to provide an output signal having a wide frequency spectrum. This signal is coupled to a filter means for passing predetermined frequencies in at least two bandwidths to a detector means which determines the amplitudes of the signal in each bandwidth. Comparator means compares the detected amplitudes and provides an output signal when the relative magnitudes of the amplitudes fall within a predetermined ratio range that is indicative of seed striking the sensor.

The filter means may include two bandpass filters, one of which will pass a predetermined band of frequencies contained in the 0 to 25 kHz range and the other of which will pass a band of frequencies in the 25 to 100 kHz range.

The detector means may include two peak amplitude or two average amplitude detectors, one for each of the bandpass filters.

The comparator may include logic circuits which provide an output signal when the magnitudes of a first signal on its first input terminal and a second signal on its second input terminal are in the ratio range 1/1 to 0. This ratio range has been found to be adequate for both light and heavy seed grains, however the comparator would also include a selector switch having two positions, one for light seed grains and the other for heavy seed grains. In position one, the magnitude of the low frequency amplitude is coupled to the first input terminal and the magnitude of the high frequency amplitude is coupled to the second input terminal. In position two, the magnitude of the low frequency amplitude is coupled to the second input terminal and the magnitude of the high frequency amplitude is coupled to the first input terminal.

DESCRIPTION OF THE PREFERRED EMBODIMENTS

It has been determined that the seed and the chaff of any particular grain, when impinging upon a particular sensor, will produce signals having two distinctive frequency power spectrums. Though amplitudes vary across each of the frequency spectrums, they vary in a different manner for seed and for chaff. In addition, it has further been determined that the seeds of different grains produce frequency power spectrums which are distinct one from the other.

Figure 1:
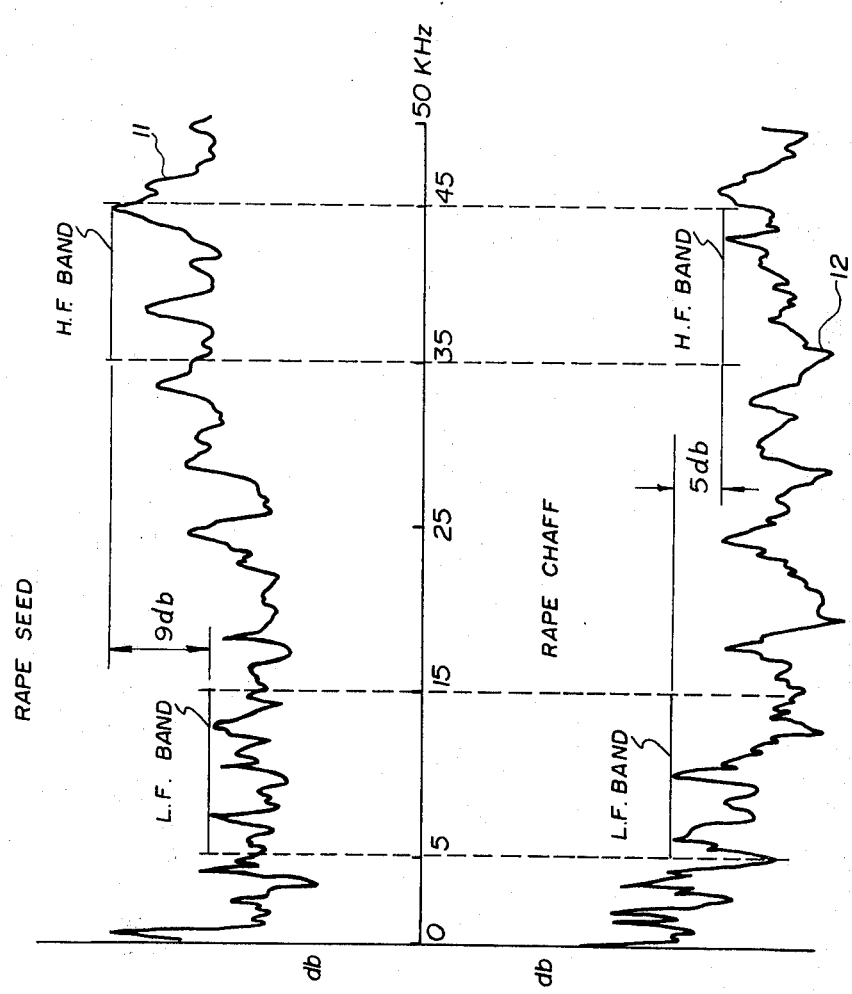
FIG. 1 illustrates frequency power spectrum plots for the seed and chaff of rape.

FIG. 1 represents the frequency power spectrums for rape seed, plot 11, and rape chaff, plot 12. Each plot represents the average results of dropping ten seeds or fragments of chaff on a typical 5 cm × 12 cm aluminum sensor plate. As can be seen in FIG. 1, the amplitudes tend to be greater at the higher frequencies than at the lower frequencies for the rape seed while the reverse is true for the rape chaff. This is also typical for other light oil grains such as flax, etc.

In FIG. 1, it is particularly seen that the peak amplitudes in a high frequency band, 35 to 45 kHz, is 9 dB or 2.8 times greater than the peak amplitudes in a low frequency band, 5 – 15kHz, for the rape seed while the peak amplitudes in the high frequency band is 5 dB or 1.8 times lower than the peak amplitudes in the low frequency band for rape chaff. Therefore if a sensor produces an output signal wherein the peak amplitude in the high frequency band is from 1.8 to 5.6 times greater than the peak amplitude in the low frequency band, it can be concluded that a seed has struck the sensor.

Figure 2:
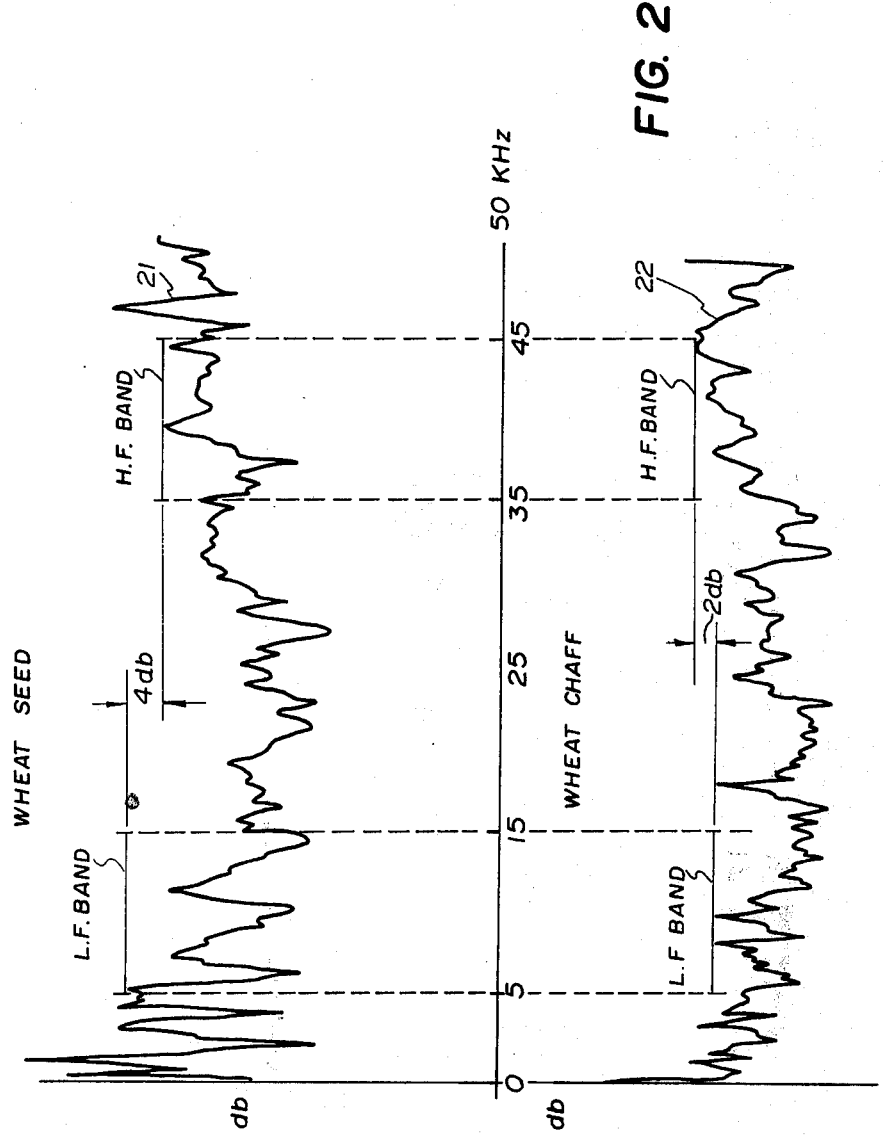
FIG. 2 illustrates frequency spectrum plots for the seed and chaff of wheat.

FIG. 2 represents the frequency power spectrums for wheat seed, plot 21, and wheat chaff, plot 22. Each plot again represents the averaged results of dropping ten seeds and fragments of chaff on a typical 5 cm × 12 cm aluminum sensor plate. These plots 21 and 22 show that for wheat, which is typical for heavy seed grains such as barley, oats, etc., the amplitudes tend to be smaller at the higher frequencies than at the lower frequencies for the seed while the amplitudes tend to be *greater* at the higher frequencies for the chaff. In particular, for the same bandwidths which were discussed with respect to FIG. 1, the peak amplitudes in the high frequency band is 4 dB or 1.6 times *lower* than the peak amplitudes in the low frequency band for wheat seed while the peak amplitudes in the high frequency band is 2 dB or 1.25 times *greater* than the peak amplitudes in the low frequency band for wheat chaff. Therefore, if a sensor produces an output signal wherein the peak amplitude in the low frequency band is from 1.12 to 3.16 times greater than the peak amplitude in the high frequency band, it can be concluded that seed has struck the sensor.

Figure 3:
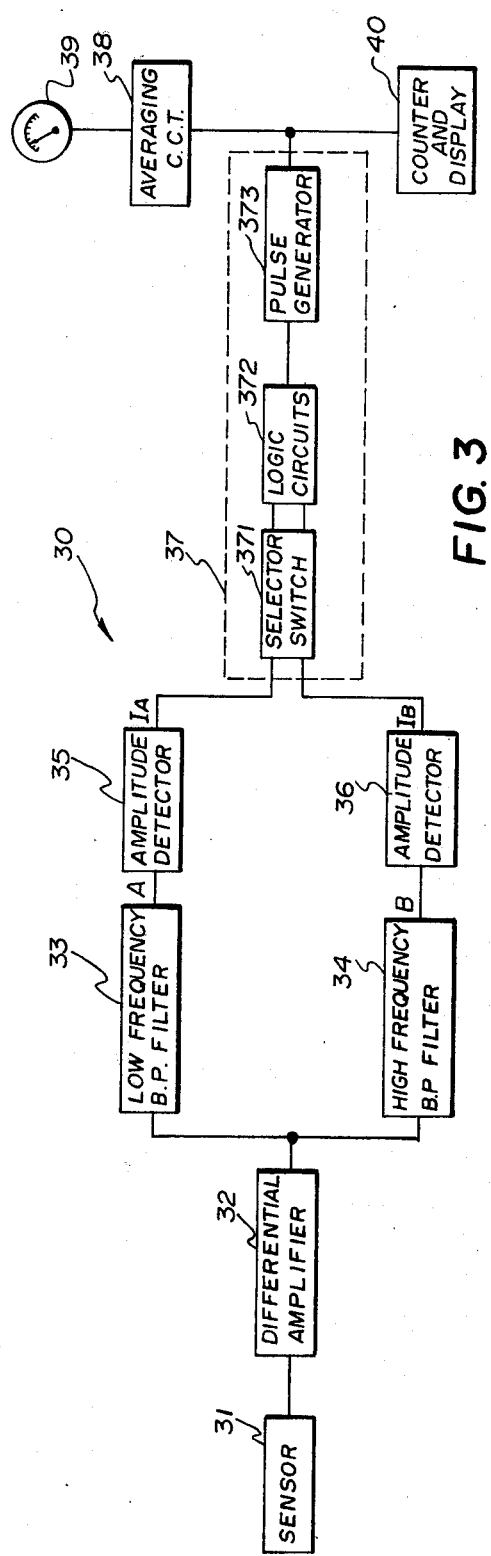
FIG. 3 is a schematic diagram of a monitor in accordance with this invention.

Since each grain has its own distinctive frequency power spectrum, particular bandwidths may be selected from the spectrum and a ratio established between the peak or average amplitudes in these bandwidths which will allow the detection of the seed of any particular grain. Though the number of bandwidths selected and their frequency range can be varied depending on the sensitivity required, it has been determined that for the monitoring of grain loss, the selection of two bandwidths is usually sufficient, and one embodiment of such a monitor is described with respect to FIG. 3.

The grain flow rate monitor 30 includes a sensor 31 which is mounted on the walkers or sieve at the rear of a thresher, or at any other location, in such a way that the grain being lost will impinge upon the sensor 31. The sensor 31 will be described in further detail with respect to FIG. 4. The signal from the sensor 31 is amplified in a differential amplifier 32 which reduces electrical noise picked up from the engine, power lines, etc. The signal is coupled to two bandpass filters 33 and 34 which each pass a selected bandwidth, A and B respectively, of the signal from the differential amplifier 32. Two amplitude detecting circuits 35 and 36 measure the amplitudes (power level) of the two frequency components A and B respectively. A logical comparator 37 compares the amplitudes $I_A$ and $I_B$ of the two signals A and B, and emits a square pulse to the averaging circuit 38 if the ratio $I_A/I_B$ between the amplitudes of the two signals are within a preset range. Amplitude levels falling outside the preset ratio range are ignored. The averaging circuit 38 produces a dc voltage which is proportional to the frequency at which seeds are striking the sensor 31 and which is then displayed to the operator on a meter 39. A counter and digital type display 40 may also be used to display the grain loss to the operator.

The comparator 37 includes logic circuits 372 which perform the logic functions of determining the ratio of the input signals thereto, a selector switch 371 which couples the output of the amplitude detectors to the logic circuits, and a pulse generator 373 which under the control of logic circuits 372, generates an output pulse when a seed is detected. Logic circuits 372 may consist of a conventional divider circuit coupled to a conventional window comparator circuit which may be of the types illustrated on pages 279–280 and 364 to 366 respectively of the text "Operational Amplifiers Design and Applications" by Burr-Brown Research Corporation, published by McGraw-Hill Book Company Inc. in 1971, Library of Congress Catalog Card Number 74-163297.

In the above embodiment, the two bandpass filters 33 and 34 may have bandwidths A and B respectively of approximately 5 kHz centered at 10 kHz and 40 kHz. These bandwidths have been selected, as they may be incorporated into a simple device capable of monitoring all types of grain, whether heavy or light seed. However, in general, the bandwidths A and B which may vary for different applications should be contained in the 0 to 25 kHz range and the 25 to 100 kHz range respectively.

The amplitude detector circuits 35 and 36 preferably only detect amplitudes at or above a particular threshold level so as to eliminate noise.

The comparator 37 may be constructed such that the ratio range in the circuits 372 is fixed for one particular grain such as $I_A/I_B = 1/1$ to $1/6$ for rape or $I_A/I_B = 1/1$ to $4/1$ for wheat. However to provide the versatility of a monitor capable of satisfactorily monitoring all grains, it is preferable that comparator 37 include selector switch 371 with at least two positions, one for light grains and one for heavy grains, and that the ratio for light grains be the inverse of the ratio for heavy grains, such as $I_A/I_B = 1/1$ to $0$ for light grains and $1/1$ to $\infty$ for heavy grains, though a ratio range $I_A/I_B$ of $1/1$ to $1/6$ for rape and $1/1$ to $6/1$ for wheat would be satisfactory. The operator would then choose the ratio range desired by simply positioning the selector switch to one position or the other. In its simplest form, the selector switch 371 may be a double-pole double-throw mechanical or electronic switch which reverses the inputs to the logic circuits 372 to effectively reverse the ratio ranges. In addition, the comparator 37 may be integral with or incorporated with the amplitude detectors 35 and 36, with the threshold levels of the amplitude detectors providing the necessary ratio discriminations.

If it is found that greater accuracy is required, the monitor may include 2 or more variable bandpass filters which each may be set to allow the passage of specific frequencies for a specific type of grain to be monitored and the comparator 37 may include logic circuits 372 with selectable ratios under the control of selector switch 371 such that comparator 37 will respond to a specific ratio of signals from the bandpass filters for the type of grain being monitored.

Figure 4:
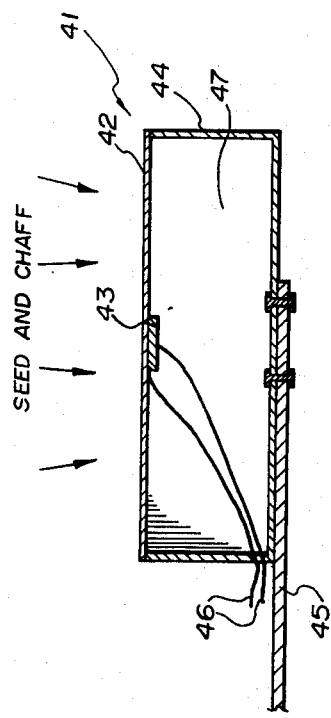
FIG. 4 illustrates in cross section one form of an acousto-electric sensor.

FIG. 4 illustrates one type of sensor 41 which may be used in conjunction with the monitor in accordance with this invention.

The sensor 41 consists of an aluminum sounding board 42 with a piezeoelectric crystal 43 mounted on the back. The sounding board 42 is suitably supported on a plastic box 44 and mounted in the flow of grain and chaff by a mounting bracket 45 so that particles striking the sensor will cause the sounding board to "ring". The mechanical vibrations are transformed to electrical impulses by the piezeoelectric crystal 43 and are carried to the differential amplifier 32 (FIG. 3) by means of leads 46. The sounding board may be of various shapes and sizes and may be of materials other than aluminum. Electro-mechanical transducers other than piezeoelectric crystals may be used, and the transducer may be mounted on the front of the sounding board if desired. Foam 47 or other damping material can be placed against the sounding board 42 to prevent the sounding board from "ringing" too long preventing a rapid counting frequency.

I claim:

1. An apparatus for monitoring the chaff ejected from a thresher for seed loss comprising:

acousto-electric sensing means for providing an output in response to impinging chaff and seed when mounted on the thresher in the path of the ejected chaff;

filter means coupled to said sensing means for passing predetermined frequencies of said sensor signal, said frequencies being grouped in two bandwidths;

means coupled to said filter means for detecting the amplitude of the signal in each of said bandwidths; and comparator means for receiving the output signals from the detecting means and for providing an output signal when the amplitudes of said detected output signals are in a predetermined ratio range, said comparator output signal being a function of the number of seeds ejected with the chaff.

2. An apparatus as claimed in claim 1 wherein said filter means includes:

a first bandpass filter to pass a band A of frequencies contained in the 0 to 25 kHz range; and a second bandpass filter to pass a band B of frequencies contained in the 25 to 100 kHz range.

3. An apparatus as claimed in claim 2 wherein said amplitude detecting means includes:

a first peak magnitude detector having a predetermined threshold level and coupled to said first bandpass filter, to provide a first output $I_A$;

a second peak magnitude detector having a predetermined threshold level and coupled to said second bandpass filter; to provide a second output $I_B$.

4. An apparatus as claimed in claim 2 wherein said amplitude detecting means includes:

a first average amplitude detector having a predetermined threshold level and coupled to said first bandpass filter, to provide a first output $I_A$;

a second average amplitude detector having a predetermined threshold level and coupled to second bandpass filter to provide a second output $I_B$.

5. An apparatus as claimed in claim 3 wherein said comparator means includes:

logic circuit means having a first input terminal means and a second input terminal means, for providing a control signal when the relative amplitude of a signal on said first terminal means with respect to the amplitude of a signal on said second terminal means is in the ratio range of 1/1 to 0;

selector switch means for coupling the first input terminal to one of the peak magnitude detectors and the second input terminal to the other peak magnitude detector; and pulse generator means coupled to the logic circuit means for providing an output pulse in response to said control signal.

6. An apparatus as claimed in claim 5 wherein said selector switch means includes two selectable positions, the first position for coupling the first amplitude detector to the first input terminal and the second amplitude detector to the second input terminal to monitor light seed grains, and the second position for coupling the first amplitude detector to the second input terminal and the second amplitude detector to the first input terminal to monitor heavy seed grains.

7. An apparatus as claimed in claim 6 which further includes:

averaging circuit means coupled to the pulse generator means for producing a dc voltage proportional to the number of pulses generated by said pulse generator means; and meter means coupled to the averaging circuit means for indicating the frequency at which seeds strike the sensor means as a function of said dc voltage.

8. An apparatus as claimed in claim 6 which further includes: means for counting the pulses generated by said pulse generator means and for displaying the count.

* * * * *